March 17, 1942.         T. J. GRYPMA                2,276,571
SPLICING METHOD
Filed Aug. 30, 1939
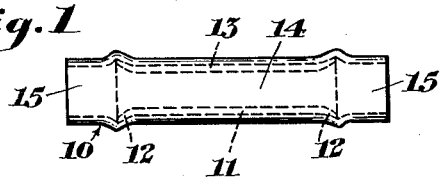
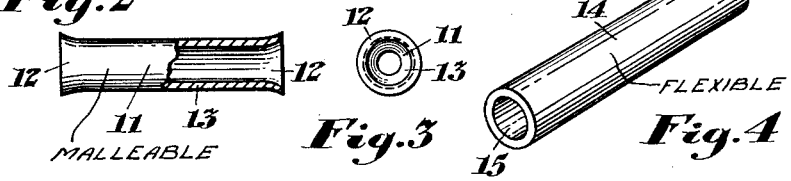
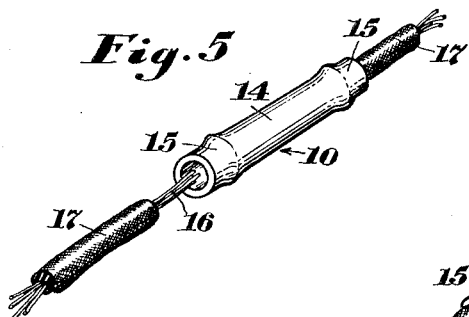
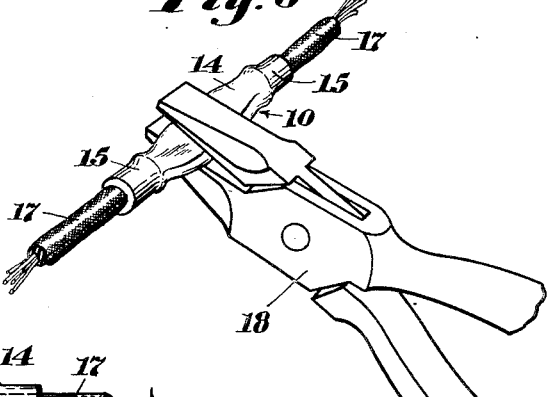
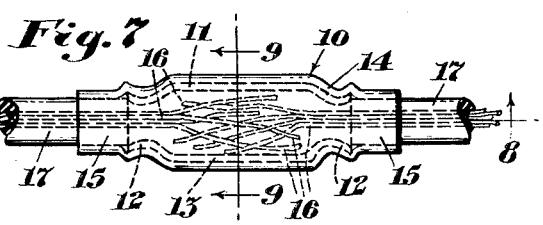
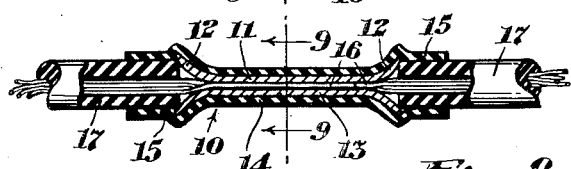
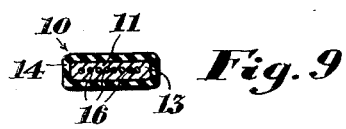
Inventor
Theodore J. Grypma
Witness:—
John S. Braddock
By Rice and Rice
Attorneys Patented Mar. 17, 1942

2,276,571

UNITED STATES PATENT OFFICE 2,276,571

SPLICING METHOD

Theodore J. Grypma, Grand Rapids, Mich.

Application August 30, 1939, Serial No. 292,621

4 Claims. (Cl. 174—90)

The present invention relates to splicing devices, and more particularly to such devices for splicing together and thus electrically connecting the bared ends of electric wires.

The primary objects of the invention are to provide a splicing device the use of which greatly facilitates and speeds up the task of splicing electric wires together; to provide such a device the use of which enables splicing of the wires and insulation of the splice in a single operation; and, to provide such a device which is especially effective in performance and decidedly economical in manufacture.

An illustrative embodiment of the invention is shown in the accompanying drawing, wherein:

Figure 1 is a side elevational view of the splicing device per se;

Figure 2 is a side elevational view, partially shown in longitudinal central vertical section, of a metal tube element of the device;

Figure 3 is an end elevational view of the same;

Figure 4 is a perspective view of a rubber sleeve element of the device;

Figure 5 is a perspective view of the splicing device illustrating the manner in which electric wires are inserted therein;

Figure 6 is a perspective view thereof illustrating the manner in which the splice is completed;

Figure 7 is a plan view of the completed splice;

Figure 8 is a sectional view of the same on line 8—8 of Figure 7; and

Figure 9 is a sectional view thereof on lines 9—9 of Figures 7 and 8.

Referring to this drawing in which like parts of the device shown are designated by the same numerals in the several views, the splicing device generally designated 10 comprises a metal tube 11 whose original form is annular as illustrated in Figures 1, 2, 3 and 5, and the opposite end portions 12 of this metal tube 11 are preferably flared outwardly. The tube 11, or at least the middle portion 13 of said tube, is of malleable metal and preferably of lead which is a good electrical conductor.

A flexible sleeve 14, preferably of rubber tubing for its insulating quality surrounds the malleable metal tube 11, the opposite end portions 15 of the sleeve 14 extending beyond the opposite ends respectively of the metal tube 11.

In the use of the splicing device, the bared ends 16 of electric wires to be spliced together and here shown as of the multiple strand type having insulation 17, are inserted into opposite ends of the splicing device 10 as illustrated in Figure 5. After such insertion, the wires are preferably twisted in opposite directions to effect intermingling of the strands of one wire with those of the other, which twisting insures direct contact of the wires but is not indispensable in the making of a good splice. The middle portion of the splicing device is then deformed or flattened as by means of pliers 18 and as shown in Figure 6, and the bared ends 16 of the wires are securely engaged between the opposite sides of the middle portion 13 of the metal tube 11.

The flexibility of the rubber sleeve 14 permits the sleeve to assume substantially the same shape as the metal tube 11, and it will be seen that the end portions 15 of the rubber sleeve 14 engage the end portions of the insulation 17 on the electric wires adjacent the splicing device, thus completely insulating the splice.

The flared outer end portions 12 of the metal tube 11 facilitate insertion of the bared ends 16 of the wires into the device, and these flared outer end portions 12 also lend rigidity to the ends of the device thus preserving the annular shape of the end portions 15 of the rubber sleeve 14, it not being intended that said flared end portions 12 of the metal tube 11 be deformed in the application of the device.

It will be understood that the invention is not limited to the preferred use of the device herein shown and described, since other possible uses including the connecting of cords or wires in packaging, etc.

It will thus be seen that the splicing device herein shown and described may be readily and conveniently applied in making splices and that the device is simple in construction and economical in manufacture, and while but one specific embodiment thereof has been herein shown and described, it will be understood that certain details of the construction shown may be altered or omitted without departing from the spirit of the invention as the same is defined by the following claims.

I claim:

1. The method of splicing and insulating the bared ends of a pair of electrically insulated wires of the multiple strand type which comprises the acts of inserting the bared end of each multiple strand wire within an opposite end of a malleable metal tube provided with an insulating sheathing, twisting each wire in an opposite direction to effect intermingling of the strands of one wire with those of the other, and thereafter flattening a substantial portion of the length of the tube intermediate its ends.

2. The method of splicing the ends of a pair of wires of the multiple strand type which comprises the acts of inserting the end of each multiple strand wire within an opposite end of a malleable metal tube, twisting each wire in an opposite direction to effect intermingling of the strands of one wire with those of the other, and thereafter flattening a portion of the length of the tube intermediate its ends.

3. The method of splicing and insulating the bared ends of a pair of electrically insulated wires of the multiple strand type which comprises the acts of inserting the bared end of each multiple strand wire within an opposite end of a malleable metal tube provided with an insulating sheathing with the end of the wire insulation in juxtaposition with the end of the tube, twisting each wire in an opposite direction to effect intermingling of the strands of one wire with those of the other, and thereafter flattening a substantial portion of the length of the tube intermediate its ends.

4. The method of splicing and insulating the bared ends of a pair of electrically insulated wires of the multiple strand type which comprises the acts of inserting the bared end of each multiple strand wire within an opposite end of a malleable metal tube provided with an insulating sheathing extending beyond the opposite ends of the metal tube with a portion of the wire insulation disposed within the sheathing, twisting each wire in an opposite direction to effect intermingling of the strands of one wire with those of the other, and thereafter flattening a substantial portion of the length of the tube intermediate its ends.

THEODORE J. GRYPMA.